United States Patent
Lee et al.

(10) Patent No.: US 10,819,481 B2
(45) Date of Patent: *Oct. 27, 2020

(54) METHOD AND APPARATUS FOR GENERATING PILOT TONE IN ORTHOGONAL FREQUENCY DIVISION MULTIPLEXING ACCESS SYSTEM, AND METHOD AND APPARATUS FOR ESTIMATING CHANNEL USING IT

(71) Applicant: Golden Valley Holdings Limited, Apia (WS)

(72) Inventors: Dong-Kwan Lee, Uiwang-si (KR); Jung-Ju Kim, Incheon (KR)

(73) Assignee: Guangdong OPPO Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/288,247

(22) Filed: Oct. 7, 2016

(65) Prior Publication Data

US 2017/0070329 A1    Mar. 9, 2017

Related U.S. Application Data

(60) Continuation of application No. 14/550,160, filed on Nov. 21, 2014, which is a division of application No. (Continued)

(30) Foreign Application Priority Data

Dec. 27, 2006  (KR) .................. 10-2006-0135417

(51) Int. Cl.
*H04L 5/00* (2006.01)
*H04J 11/00* (2006.01)
(Continued)

(52) U.S. Cl.
CPC ............ *H04L 5/0048* (2013.01); *H04J 11/00* (2013.01); *H04L 5/0007* (2013.01);
(Continued)

(58) Field of Classification Search
CPC ..... H04L 5/0048; H04L 27/18; H04L 5/0007; H04L 25/0228; H04L 27/2613; H04J 11/00; H04J 13/004; H04W 88/08
See application file for complete search history.

(56) References Cited

U.S. PATENT DOCUMENTS 6,166,622 A * 12/2000 Hosur .................. H04W 52/56
340/316
6,477,157 B1 * 11/2002 Kim .................... H04J 13/0048
370/208
(Continued)

FOREIGN PATENT DOCUMENTS

| KR | 2000208180 | 7/2000 |
|----|------------|--------|
| WO | WO 0227144 | 3/2002 |
| WO | WO 2005055543 | 6/2005 |

OTHER PUBLICATIONS

International Search Report for Application No. PCT/KR2007/006761, filed Dec. 21, 2007.
(Continued)

*Primary Examiner* — Hassan Kizou
*Assistant Examiner* — Abdullahi Ahmed
(74) *Attorney, Agent, or Firm* — Finnegan, Henderson, Farabow, Garrett & Dunner, LLP (57) ABSTRACT

The present invention relates to a pilot tone generating method and apparatus of an orthogonal frequency division multiple access system and method, and a channel estimation method and apparatus using the same. The channel estimation apparatus includes a pilot tone extracting unit for extracting a pilot tone, which is inserted within a frame with data tone, masked with an orthogonal code; a pilot tone
(Continued)

unmasking unit for unmasking of the pilot tone extracted from the pilot tone extracting unit by using an orthogonal code information; and a channel estimation operating unit for estimating a channel by calculating an average of the pilot tones which is unmasked in the unmasking unit.

20 Claims, 10 Drawing Sheets

Related U.S. Application Data

14/065,976, filed on Oct. 29, 2013, now Pat. No. 9,276,719, which is a continuation of application No. 12/521,370, filed as application No. PCT/KR2007/006761 on Dec. 21, 2007, now Pat. No. 8,588,274.

(51) Int. Cl.
  *H04L 25/02* (2006.01)
  *H04L 27/26* (2006.01)
  *H04L 27/18* (2006.01)
  *H04J 13/00* (2011.01)
  *H04W 88/08* (2009.01)

(52) U.S. Cl.
  CPC .......... *H04L 25/0228* (2013.01); *H04L 27/18* (2013.01); *H04L 27/2613* (2013.01); *H04J 13/004* (2013.01); *H04W 88/08* (2013.01)

(56) References Cited

U.S. PATENT DOCUMENTS

| | | | |
|---|---|---|---|
| 6,477,158 B1* | 11/2002 | Take | H04J 13/0044 370/335 |
| 6,798,736 B1 | 9/2004 | Black | |
| 7,286,508 B2 | 10/2007 | Abeta et al. | |
| 9,276,719 B2* | 3/2016 | Lee | H04J 11/00 |
| 2002/0031167 A1* | 3/2002 | Hamamoto | H04B 1/707 375/130 |
| 2003/0031195 A1 | 2/2003 | Okawa et al. | |
| 2004/0001429 A1* | 1/2004 | Ma | H04J 11/00 370/210 |
| 2004/0160893 A1 | 8/2004 | Park et al. | |
| 2004/0208253 A1 | 10/2004 | Joo | |
| 2004/0252629 A1* | 12/2004 | Hasegawa | H04L 5/026 370/208 |
| 2005/0088960 A1 | 4/2005 | Suh et al. | |
| 2005/0135324 A1* | 6/2005 | Kim | H04L 1/005 370/343 |
| 2006/0056355 A1* | 3/2006 | Love | H04W 74/0866 370/332 |
| 2006/0120269 A1 | 6/2006 | Kim et al. | |
| 2006/0221808 A1 | 10/2006 | Shirakata et al. | |
| 2006/0227887 A1 | 10/2006 | Li et al. | |
| 2007/0019535 A1 | 1/2007 | Sambhwani et al. | |
| 2007/0082696 A1 | 4/2007 | Wang | |
| 2007/0165588 A1 | 7/2007 | McCoy | |
| 2007/0165733 A1* | 7/2007 | Murakami | H04L 27/2695 375/260 |
| 2007/0223364 A1* | 9/2007 | Terabe | H04L 5/0037 370/208 |
| 2009/0296563 A1 | 12/2009 | Kishiyama et al. | |
| 2015/0155985 A1* | 6/2015 | Lee | H04J 11/00 370/329 |
| 2017/0070325 A1* | 3/2017 | Lee | H04J 11/00 |
| 2017/0070326 A1* | 3/2017 | Lee | H04J 11/00 |
| 2017/0070327 A1* | 3/2017 | Lee | H04J 11/00 |
| 2017/0070328 A1* | 3/2017 | Lee | H04J 11/00 |
| 2017/0070330 A1* | 3/2017 | Lee | H04J 11/00 |

OTHER PUBLICATIONS

Written Opinion of the International Searching Authority for Application No. PCT/KR2007/006761, filed Dec. 21, 2007.

Communication dated Jul. 8, 2015 issued by the U.S. Patent and Trademark Office in counterpart U.S. Appl. No. 14/065,976.

* cited by examiner

first codeword second codeword third codeword

[Fig. 7]

first orthogonal code set
second orthogonal code set
third orthogonal code set
fourth orthogonal code set

| Syntax | Size | |
|---|---|---|
| DCD_Message_Format() { | | |
| Management Message Type = 1 | 8 bits | |
| Reserved | 8 bits | |
| Configuration Change Count | 8 bits | |
| TLV Encoded information for the overall channel | Type | Length |
| Begin PHY Specific Section { | | |
| for (i=1; i<=n; i++) { | | |
| Downlink Burst Profile | | |
| } | | |
| } | | |
| } | | |

[Fig. 18]

| TLV Encoded Information | Type | Length |
|---|---|---|
| Downlink_Burst_Profile | 1 | |
| RAS EIRP | 2 | 2 |
| Channel Number | 6 | 1 |
| TTG | 7 | 2 |
| RTG | 8 | 1 |
| EIRxP$_{IR,max}$ | 9 | 2 |
| Channel switch frame number | 10 | 3 |
| Frequency | 12 | 4 |
| RAS ID | 13 | 6 |
| HARQ ACK Delay for DL Bursts | 17 | 1 |
| Permutation type for broadcast region in H-ARQ zone | 19 | 1 |
| Maximum retransmission | 20 | 1 |
| DL allocated subchannel bitmap for optional AMC permutation | 30 | 1 |
| H_Add_Threshold | 31 | 1 |
| H_Delete_Threshold | 32 | 1 |
| ASR(Anchor switch report) slot length (M) and switching period (L) | 33 | 1 |
| HO type support | 50 | 1 |
| Hysteresis margin | 51 | 1 |
| Time-to-Trigger duration | 52 | 1 |
| MAC Version | 148 | 1 |
| FA index | 21 | 1 |
| PHY mode ID | 22 | 1 |
| DL Walsh code information | xxx | 1 |

[Fig. 19]

| Syntax | Size | |
|---|---|---|
| UCD_Message_Format() { | | |
|     Management Message Type = 0 | 8 bits | |
|     Configuration Change Count | 8 bits | |
|     Ranging Backoff Start | 8 bits | |
|     Ranging Backoff End | 8 bits | |
|     Request Backoff Start | 8 bits | |
|     Request Backoff End | 8 bits | |
|     TLV Encoded information for the overall channel | Type | Length |
|     Begin PHY Specific Section { | | |
|         for (i=1; i<=n; I++) { | | |
|             Uplink Burst Profile | | |
|         } | | |
|     } | | |
| } | | |

[Fig. 20]

| TLV Encoded Information | Type | Length |
|---|---|---|
| Uplink_Burst_Profile | 1 | |
| Contention-based Reservation Timeout | 2 | 1 |
| Frequency | 5 | 4 |
| HO_ranging_start | 7 | 1 |
| HO_ranging_end | 8 | 1 |
| Initial ranging backoff start | 9 | 1 |
| Initial ranging backoff end | 10 | 1 |
| Bandwidth request backoff start | 11 | 1 |
| Bandwidth request backoff end | 12 | 1 |
| Normalized C/N override 2 | 175 | 8 |
| UL Walsh code information | xxx | 1 |

METHOD AND APPARATUS FOR GENERATING PILOT TONE IN ORTHOGONAL FREQUENCY DIVISION MULTIPLEXING ACCESS SYSTEM, AND METHOD AND APPARATUS FOR ESTIMATING CHANNEL USING IT

This application is a continuation of U.S. application Ser. No. 14/550,160, filed Nov. 21, 2014, which is a divisional of U.S. application Ser. No. 14/065,976, filed Oct. 29, 2013, now U.S. Pat. No. 9,276,719, issued Mar. 1, 2016, which is a continuation of U.S. application Ser. No. 12/521,370, filed Jun. 26, 2009, now U.S. Pat. No. 8,588,274, issued Nov. 19, 2013, which is a National Stage of International Application No. PCT/KR2007/006761, filed Dec. 21, 2007, and claims the benefit of priority from Korean Patent Application No. KR 10-2006-0135417, filed Dec. 27, 2006. The entire contents of all of the aforementioned applications are incorporated herein by reference.

TECHNICAL FIELD

The present invention relates to an OFDM/OFDMA (Orthogonal Frequency Division Multiplexing/Orthogonal Frequency Division Multiplexing Access) transmission system, more particularly, to the method and apparatus for generating a pilot tone capable of eliminating an interference by users within a different cells or sectors in an OFDMA system, and the channel estimation method and apparatus corresponding to it.

BACKGROUND ART

OFDM or OFDMA which is based it is a multicarrier modulation scheme which parallely transmits data by using a multiple orthogonal subcarriers instead of a single carrier having a broad band. It is based on the fact that each subchannel of a narrowband has the flat fading characteristic in the frequency selective fading channel having the very large ISI (Inter-Symbol Interference).

In OFDM, as the symbol is determined on the frequency domain, it is necessary to have an equalizer for frequency domain in order to compensate for the channel distortion of the received symbol. For this, in addition to sending data symbol, the transmitter of the OFDM transmission system transmits the pilot symbol used for the channel estimation for the equalization of data symbol by estimating the characteristics of the channel transmitting a signal.

Figure 1:
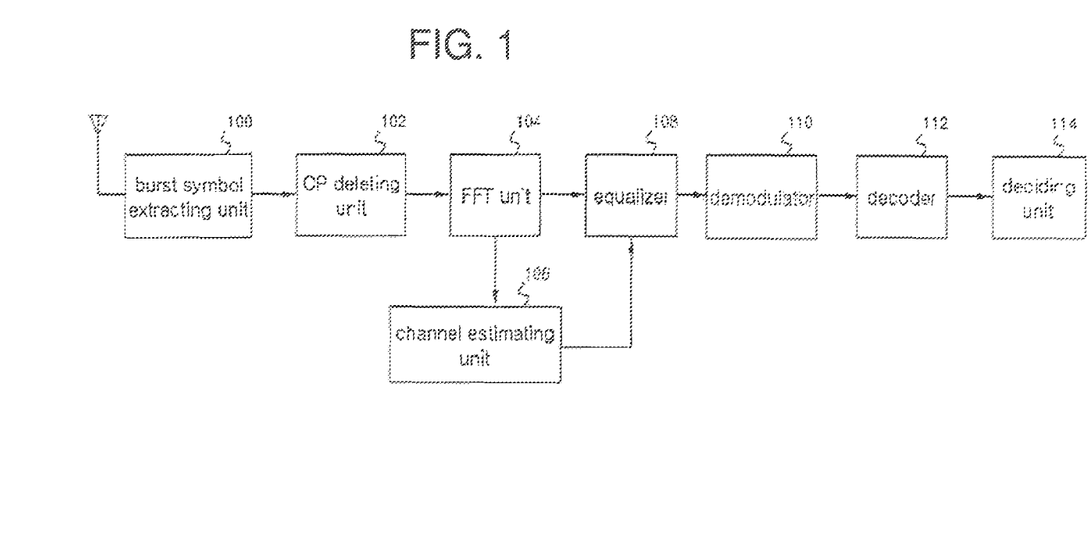
FIG. 1 is a block diagram that shows the configuration of OFDM receiver of the related art.

FIG. 1 is a block diagram that shows the configuration of OFDM receiver of the related art, showing schematically only the unit that restores data from the baseband signal obtained from the received signal.

A burst symbol extracting unit 100 extracts the OFDM symbol from the baseband signal obtained from the received signal by the RF (Radio Frequency) processing unit (not shown). As to the OFDM symbol which is extracted by the burst symbol extracting unit 100, it is applied to an equalizer 108, after the CP (Cyclic Prefix) which is inserted by a CP deleting unit 102 from the transmitter is eliminated and PFT (Fast Fourier Transform) is performed by an EFT unit 104. The equalizer 108 compensates for the channel distortion according to the channel characteristic value Which is estimated by a channel estimating unit 106 for the FFT data signal.

After being demodulated in a demodulator 110, the signal compensated the channel distortion performs Viterbi decoding by a decoder 112 and data are restored by the determination of a deciding unit 114. The channel estimating unit 106 performs the channel estimation by using the pilot tone. Pilot tones are arranged between OFDM data tones. In the meantime, when the channel is estimated, the pilot tone is interfered by the pilot tones from the cell of the adjacent base station or other user of the sector. Therefore, the pilot tone interference cancellation technology capable of the exact channel estimation in spite of the interference signal is required.

DISCLOSURE OF INVENTION

Technical Problem

Accordingly, an object of the present invention is to solve at least the problems and disadvantages of the related art. The present invention is to provide the pilot tone generating method and apparatus in an orthogonal frequency division multiple access system capable of generating the pilot tone for the exact channel estimation without the interference of the pilot tone of the adjacent base station that affects the pilot tone.

Another object of the present invention is to provide the channel estimation method and apparatus using the pilot tone generating method and apparatus in the orthogonal frequency division multiple access system.

Technical Solution

In order to accomplish the object, according to an aspect of the present invention, provided is a pilot tone generating method in an orthogonal frequency division multiple access system which uses for subcarriers having an orthogonality and transmits data by frame, which comprises the steps of: (a) inserting a data tone and a pilot tone into the frame; (b) PRBS (Pseudo Random Binary Sequence) masking for the data tone; and (c) masking an orthogonal code for the pilot tone.

In accordance with an aspect of the present invention, at the step (b), masking the orthogonal code for eight pilot tones forming a rectangular window form, when the frame is a down-link subframe. The masking of the orthogonal code is performed by moving the rectangular window from left to right, from top to bottom, by pilot tone inserted into the frame. A set of the orthogonal code for eight pilot tones is an eight-bit orthogonal code set having an orthogonality for a different code. At the step (b), masking the orthogonal code for four pilot tones forming a tile of an up-link subframe, when the frame is the up-link subframe. A set of the orthogonal code for four pilot tones is a four-bit orthogonal code set having an orthogonality for a different code. At the step (c), the masking is performed by allocating the same orthogonal code to sectors within each cell and allocating a different orthogonal code to the each cell, when FRF (Frequency Reuse Factor)-3 is applied. At the step (c), the masking is performed by allocating a different orthogonal code to each sector within a cell, when FRF (Frequency Reuse Factor)-1 is applied. After the step (c), an aspect of the present invention further comprises the step (d) transmitting the masked orthogonal code information. At the step (d), the orthogonal code information is included in a DCD TLV (Downlink Channel Descriptor Type, Length, Value) field of a NBR-ADV message (Neighbor Advertisement Message).

According to another aspect of the present invention, provided is a pilot tone generating apparatus of an orthogonal frequency division multiple access (OFDMA) system, which comprises a data and pilot inserting unit for inserting a data tone and a pilot tone into a frame of the OFDMA system; a PRBS (Pseudo Random Binary Sequence) masking unit for masking a PRBS for the data tope; and an orthogonal code masking unit for masking an orthogonal code for the pilot tone.

The orthogonal code masking unit masks the orthogonal code for eight pilot tones forming a rectangular window form when the frame is a down-link subframe, and masks theorthogonal code for four pilot tones forming a tile of an up-link subframe when the frame is the up-link subframe. The orthogonal code masking unit masks the orthogonal code by moving the rectangular window from left to right, from top to bottom, by pilot tone inserted into the frame. The orthogonal code masking unit masks the orthogonal code by allocating the same orthogonal code to sectors within each cell and allocating a different orthogonal code to the each cell, when FRF (Frequency Reuse Factor)-3 is applied. The orthogonal code masking unit masks the orthogonal code by allocating a different orthogonal code to each sector within a cell, when FRF (Frequency Reuse Factor)-1 is applied.

According to still another aspect of the present invention, provided is a channel estimation method by using a pilot tone in a receiver receiving an orthogonal frequency division multiple signal by frame, which comprises the steps of: (a) extracting a pilot tone, which corresponds to a channel for estimating, masked with an orthogonal code from a received signal; (b) unmasking the extracted pilot tone; and (c) estimating a channel by calculating an average of the unmasked pilot tones.

At the step (b), unmasking the masked orthogonal code for eight pilot tones forming a rectangular window form when the frame is a down-link subframe. The unmasking of the orthogonal code is performed by moving the rectangular window from left to right, from top to bottom, by channel. At the step (b), unmasking the masked orthogonal code for four pilot tones forming a tile of up-link subframe, when the frame is the up-link subframe. At the step (b), the unmasking is performed by using the orthogonal code information received before the step (a). The orthogonal code information is an orthogonal code masking information which is included in a NBR-ADV message (Neighbor Advertisement Message) field.

According to still another aspect of the present invention, provided is a channel estimation apparatus for estimating a channel by using a pilot tone in an orthogonal frequency division multiple access system, which comprises a pilot tone extracting unit for extracting a pilot tone, which is inserted within a frame with data tone, masked with an orthogonal code; a pilot tone unmasking unit for unmasking of the pilot tone extracted from the pilot tone extracting unit by using an orthogonal code information; and a channel estimation operating unit for estimating a channel by calculating an average of the pilot tones which is unmasked in the unmasking unit.

The unmasking unit unmasks the masked orthogonal code for eight pilot tones forming a rectangular window form when the frame, is down-link subframe, and unmasks the masked orthogonal code for four pilot tones forming a tile of an up-link subframe when the frame is the up-link subframe. The pilot tone unmasking unit unmasks the unasked orthogonal code by moving the rectangular window from left to right, from top to bottom, by channel.

Advantageous Effects

According to the present invention, even when the interference signal exists, the relatively exact channel estimation is possible by using an orthogonal code so that the portable Internet (WiBro/WiMax) system performance can be improved. Particularly, in a channel estimation, an interference between users that is the interference by the users of other cell or sector can be eliminated. Further, a much more performance improvement can be implemented as the signal can be coherently combined in a diversity combining. Additionally, the interference power can be accurately measured as far as possible, so that the performance of CINR (Carrier Interference to Noise Ratio) measurement can be improved.

The present invention can be applied to the OFDM system including the WiBro system. And even if the orthogonal code is moved to the time and frequency axis, the orthogonality is still maintained so that a successive channel estimation is possible. Further, the size of the orthogonal code window is determined by the coherence time and the coherence bandwidth. By measuring the power loaded in a coding word except the desired orthogonal code word, the interference power can be easily calculated.

BRIEF DESCRIPTION OF THE DRAWINGS

The above and other exemplary features, aspects, and advantages of the present invention will be more apparent from the following detailed description taken in conjunction with the accompanying drawings, in which.

MODE FOR THE INVENTION

Hereinafter, exemplary embodiments of the present invention will be described with reference to the accompanying drawings. The same elements will be designated by the same reference numerals all through the following description and drawings although they are shown in different drawings. Further, in the following description of the present invention, a detailed description of known functions and configurations incorporated herein will be omitted when it may make the subject matter of the present invention rather unclear.

Firstly, the pilot tone generating method and apparatus in the orthogonal frequency division multiple access system will be illustrated.

Figure 2:
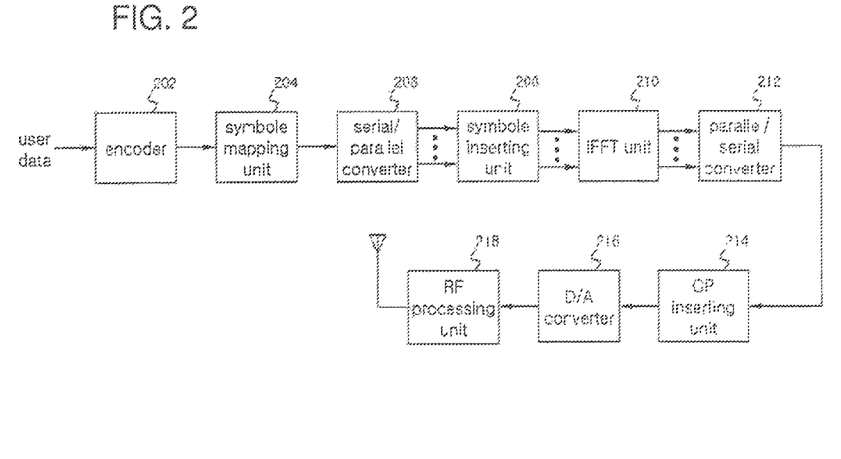
FIG. 2 is a block diagram that is the configuration of an example of an OFDM wireless communication system transmitter applying the pilot tone generating method and apparatus in an orthogonal frequency division multiple access system according to the present invention.

FIG. 2 is a block diagram that shows the configuration of an example of an OFDM (Orthogonal Frequency Division Multiplexing) wireless communication system transmitter applying the pilot tone generating method and apparatus of an orthogonal frequency division multiple access system according to the present invention. The transmitter includes an encoder 202, a symbol mapping unit 204, a serial/parallel converter 206, a symbol inserting unit 208, an IFFT (Inverse Fast Fourier Transform) unit 210, a parallel/serial converter 212, a CP (Cyclic Prefix) inserting unit 214, a D/A (Digital/Analog) converter 216 and an RF (Radio Frequency) processing unit 218.

If a user data is inputted, to the encoder 202, after coding the inputted user data, the encoder 202 outputs the user data to the symbol mapping unit 204. Here, the coding scheme performed in the encoder 202 can be the turbo coding scheme having the coding rate or the convolutional coding scheme. The symbol mapping unit 204 modulates the coded bit outputted from the encoder 202 with a corresponding modulation scheme and generates the modulation symbol to output to the serial/parallel converter 206.

Here, the BPSK (Binary Phase Shift Keying), the QPSK (Quadrature Phase Shift Keying) scheme, 16QAM (Quadrature Amplitude Modulation) or 64QAM scheme can be used for the modulation scheme.

After inputting the series modulation symbols outputted from the symbol mapping unit 204, the serial/parallel converter 206 parallel transforming them, and outputting them to the symbol inserting unit 208. The symbol inserting unit 208 inserts data symbols and pilot symbols into the modulated parallel transformed symbols which are outputted from the serial/parallel converter 206, outputting to the IFFT unit 210, after performing the PRBS (Pseudo Random Binary Sequence) masking and the orthogonal code masking, sequentially. After inputting the signal outputted from the symbol inserting unit 208 and performing the N-point IFFT, the IFFT unit 210 outputs to the parallel/serial converter 212.

The parallel/serial converter 212 inputs the signal outputted from the IFFT unit, and outputting to the CP inserting unit 214 after a serial transformation. After inputting the signal outputted from the parallel/serial converter 212 and inserting the CP signal, the CP inserting unit 214 outputs to the D/A converter 216. The CP is inserted in order to eliminate the interference between the OFDM symbol transmitted in the previous OFDM symbol time and the present OFDM symbol when transmitting the OFDM symbol in an OFDM communication system. After inputting the signal outputted from the CP inserting unit 214 and converting into the analog, the D/A converter 216 outputs to the RF processing unit 218. The RF processing unit 218 including a filter and a preprocessor performs RF processing off the signal outputted from the D/A converter 216 in order to actually can be transmitted on-air, and transmits on-air through a transmission antenna.

Figure 3:
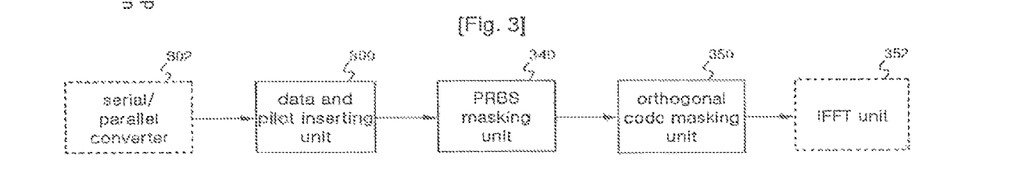
FIG. 3 is a block diagram that shows the configuration of the pilot tone generating apparatus in an orthogonal frequency division multiple access system according to the present invention.

FIG. 3 is a block diagram that shows the configuration of the pilot tone generating apparatus in an orthogonal frequency division multiple access system according to the present invention, corresponding to the pilot symbol inserting unit 208 of FIG. 2. The pilot tone generating apparatus includes a data and pilot inserting unit 300, a PRBS masking unit 340 and an orthogonal code masking unit 350. The data and pilot inserting unit 300 insert the data tone and pilot tone into the frame of the orthogonal frequency division multiple access system.

Figure 4:
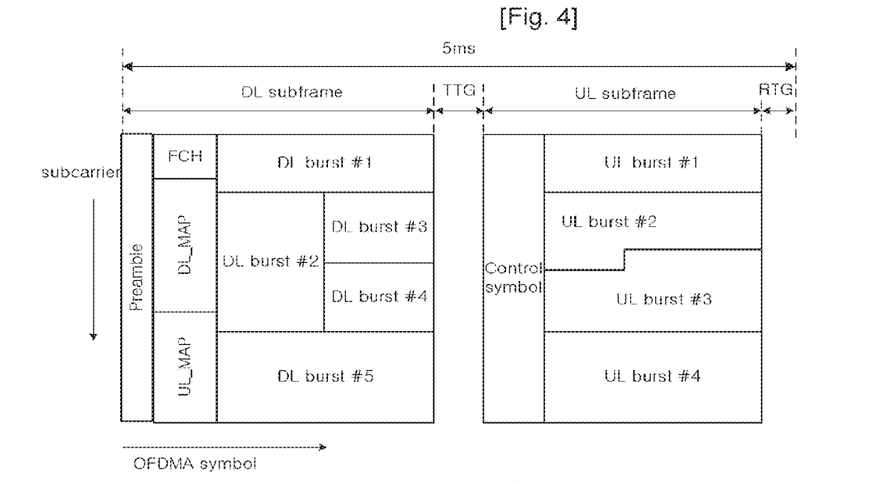
FIG. 4 shows an example of an OFDMA TDD frame structure according to the IEEE 802.16e standards.

FIG. 4 shows an example of an OFDMA (Orthogonal Frequency Division Multiple Access) TDD (Time Division Duplexing) frame structure according to the IEEE 802.16e standards. The frame includes a DL (Down Link) subframe and an UL (Up Link) subframe.

Referring to FIG. 4, the first symbol of DL subframe is allocated as preamble and such preamble is used for the frame synchronization and the cell identification. The TTG (Tx/Rx Transition Gap) is inserted between DL subframe and UL subframe and the RTG (Rx/Tx Transition Gap) is inserted between the frame end and beginning. Additionally, the initial four subchannel of two OFDMA symbols which are transmitted immediately after the preamble includes the FCH (Frame Control Header) of twenty four bits for transmitting the frame constitution information. Such DL subframe can be comprised of a plurality of zones. Each zone can be changed by the OFDMA symbols while being classified by the OFDMA subchannel assignment scheme. The subchannel assignment scheme includes the PUSC (Partial Usage of Subchannels), the FUSC (Full Usage of Subchannels), Band-AMC.

Further, in the OFDMA system, data are transmitted to UL through the subchannel allocated by each subscriber. Such UL subframe can be comprised of a plurality of zones. Like the DL, each zone is classified by the OFDMA subchannel assignment scheme, and can be changed by the OFDMA symbol. The subchannel assignment scheme of UL includes UL-PUSC, UL-OPUSC, and UL Band AMC.

Additionally, the ranging subchannel illustrated in the lower portion of UL subframe illustrated in FIG. 4 is used for UL synchronization acquisition and the power control between the base stations of a mobile terminal, and the bandwidth demand of a mobile terminal. In the WiBro, four kinds of mode including the initial ranging, the periodic ranging, the hand-off ranging, and the bandwidth request ranging are defined. In the UL, the synchronization is performed through the ranging process. In such UL the time point of receiving signal can be changed as the channel environment is different in each mobile terminal, and the magnitude of received power can be changed. In case of the UL signal, the base station has to estimate the channel for each user since the base station receives the signal of the different mobile terminal that has passed through other channel environment.

The PRBS masking unit 340 performs the PRBS masking for the data tone. The PRBS masking is performed by using the PRBS value ($X^{11}+X^9+1$) which is generated from the PRBS generator. The orthogonal code masking unit 350 performs the masking of the orthogonal code for the pilot tone. When it is the DL subframe, it is desirable that the orthogonal code masking unit 350 performs the masking of the orthogonal code for the adjacent eight or four pilot tone forming the rectangular window form. An example of the orthogonal code set for eight pilot tones is the same as FIG. 5, and an example of the orthogonal code set for four pilot tones is the same as FIG. 7.

Figure 6:
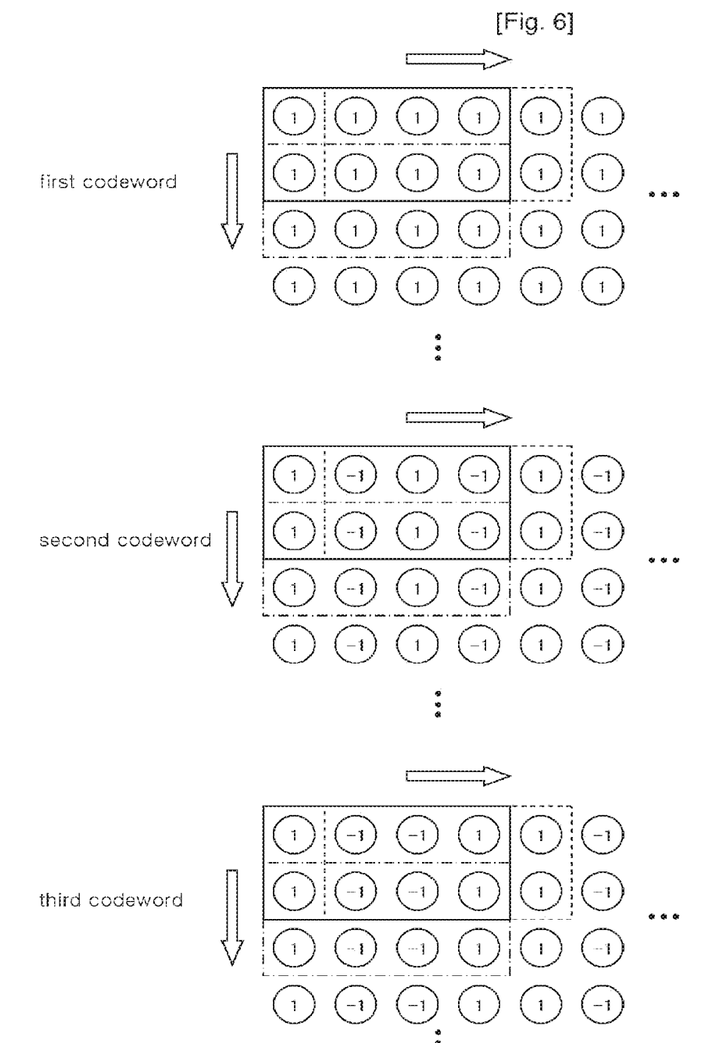
FIG. 6 shows a rectangular window which is performed while moving from left to right, from top to bottom, by the pilot tone unit forming a down-link subframe.

Additionally, as shown in FIG. 6, the orthogonal code masking is inserted into the DL subframe, while moving the rectangular window from left to right, from top to bottom, by the adjacent eight pilot tones to perform. In FIG. 6, each codeword can be allocated one by one for each base station. Further, when the orthogonal code masking unit 350 is the UL subframe, the orthogonal code is masked for four pilot tones forming the tile of the UL subframe.

Figure 5:
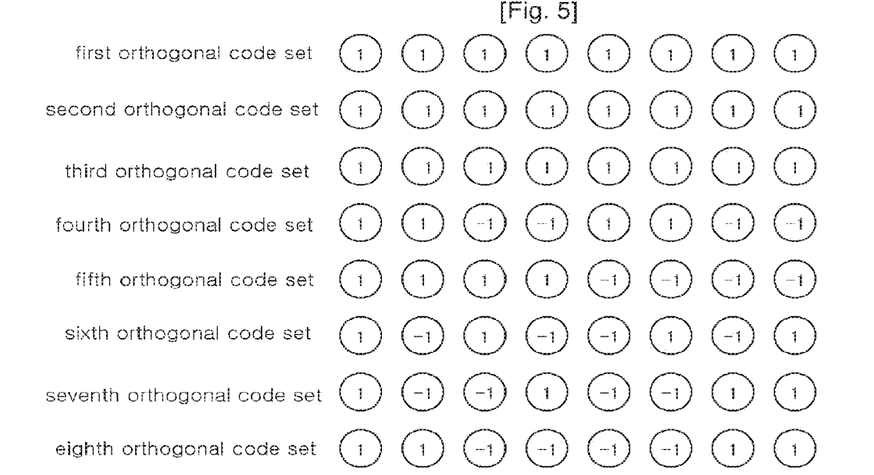
FIG. 5 shows an example of an orthogonal code set for eight pilot tones.
Figure 7:
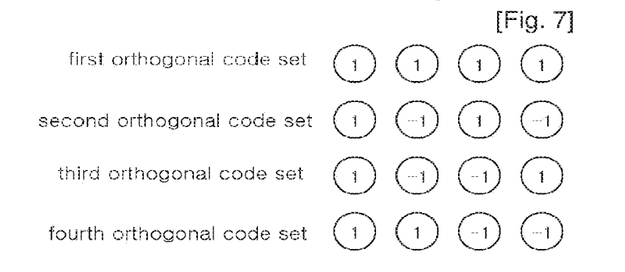
FIG. 7 shows an example of an orthogonal code set for four pilot tones.

As shown in FIGS. 5 and 7, it can be known that the codes used in the present invention has an orthogonality. FIG. 6 shows the case of 2×4 window size, while other window size also can be shown. It is shown that the orthogonality is established even when the window is moved to right and downwards from the orthogonal codeword one to eight.

Figure 8:
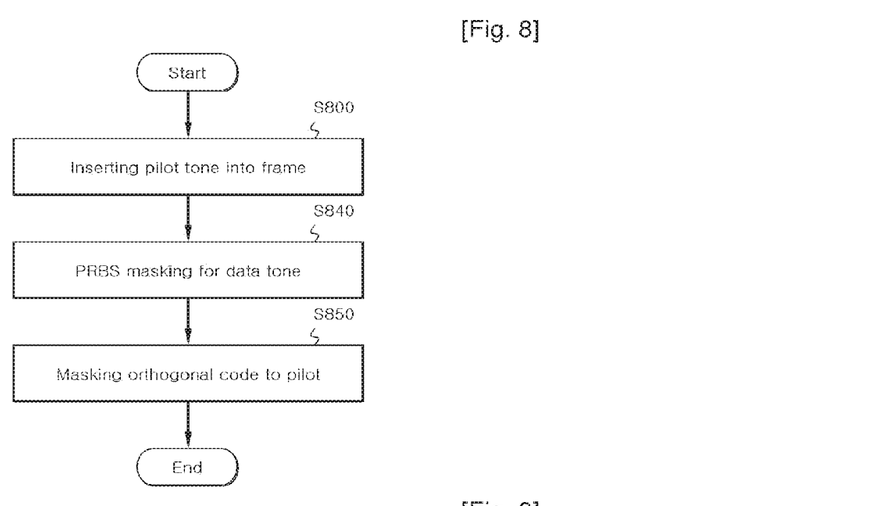
FIG. 8 is a flowchart that shows the pilot tone generating method in an orthogonal frequency division multiple access system according to the present invention.

FIG. 8 is a flowchart that shows the pilot tone generating method in an orthogonal frequency division multiple access system according to the present invention.

Figure 9:
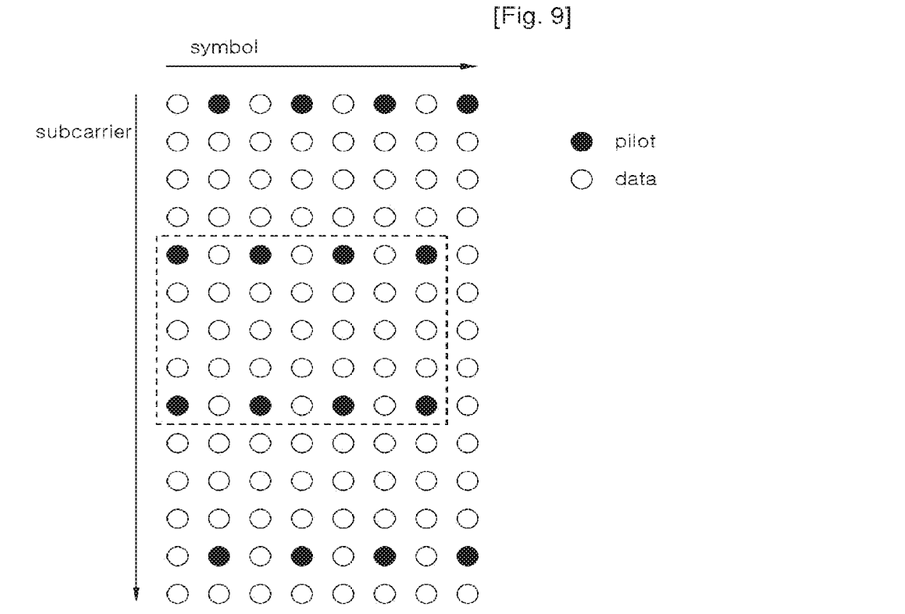
FIG. 9 shows an example of a rectangular window comprised of eight pilot tones forming the rectangular window form in case of down-link subframe.
Figure 10:
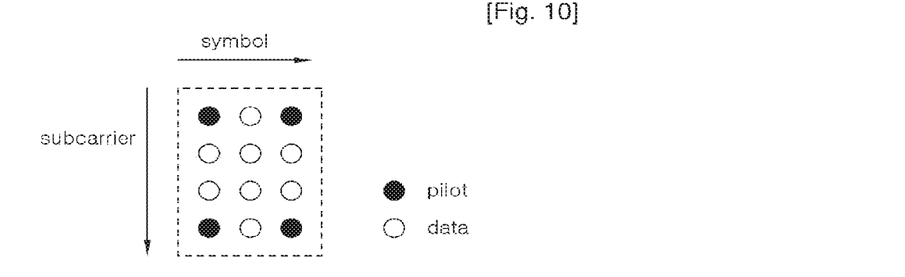
FIG. 10 shows a tile comprised of four pilot tones in case of up-link subframe.

Firstly, the data tone and the pilot tone are inserted into the frame of the orthogonal frequency division multiple access system formed through the serial/parallel converter 302 (S800), and then, PRBS masking for the data tone (S840). Subsequently, the orthogonal code is masked for the pilot tone (S850). In detail, in case of the DL subframe, the orthogonal code is masked for eight pilot tones which form the rectangular window form as shown in FIG. 9. As shown in FIG. 7, the orthogonal code masking can be performed, while moving the rectangular window from left to right, from top to bottom, by the pilot tone inserted into the frame. The orthogonal code set for the eight pilot tones is the same as FIG. 5. When the frame is the subframe, as shown in FIG. 10, the masking of the orthogonal code is performed for four pilot tones forming the tile of the UL subframe. The orthogonal code set for the four pilot tone is the same as FIG. 7.

Figure 11:
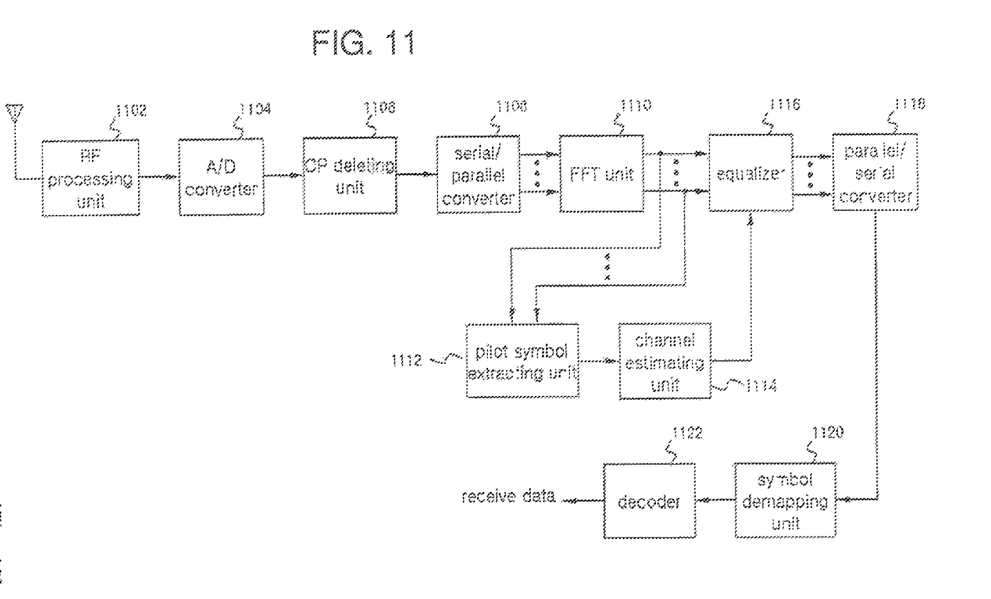
FIG. 11 is a block diagram that shows the configuration of an example of a receiver in an OFDM wireless communication system applying the channel estimating method and apparatus of an orthogonal frequency division multiple access system according to the present invention.

In the meantime, FIG. 11 is a block diagram that shows the configuration of an example of a receiver of an OFDM wireless communication system applying the channel estimating method and apparatus in an orthogonal frequency division multiple access system according to the present invention. The receiver includes a RF processing unit 1102, an A/D converter 1104, a CP deleting unit 1106, a serial/parallel converter 1108, an FFT unit 1110, a pilot symbol extracting unit 1112, a channel estimating unit 1114, an equalizer 1116, a parallel/serial converter 1118, a symbol demapping unit 1120 and a decoder 1122.

The receiver has the reverse direction structure of transmitter shown in FIG. 2. The signal transmitted from the transmitter is received by a receive antenna of the receiver with adding the noise after passing through a multipath channel. The signal received through the receive antenna is inputted to the RF processing unit 1102, and the RE processing unit 1102 outputs the signal received through the receive antenna to the A/D converter 1104 after down converting into the intermediate frequency band. After converting the analog signal outputted from the RF processing unit 1102 into the digital signal, the A/D converter 1104 outputs to the CP deleting unit 1106.

The CP deleting unit 1106 outputs to the serial/parallel converter 1108, after inputting the signal outputted from the A/D converter 1104 and eliminating the CP signal. The serial/parallel converter 1108 performs the N-point FFT through the FFT unit 1110 for the serial signal outputted from the CP deleting unit 1106, thereafter, outputting to the equalizer 1116 and the pilot symbol extracting unit 1112. After inputting the signal outputted from the FFT unit 1116 and channel-equalizing, the equalizer 1116 outputs to the parallel/serial converter 1118. The parallel/serial converter 1118 outputs to the symbol demapping unit 1120, after inputting the parallel signal outputted from the equalizer 1116 for serial transforming.

In the meantime, the signal outputted from the FFT unit 1110 is inputted to the pilot symbol extracting unit 1112. The pilot symbol extracting unit 1112 detects the pilot symbols in the signal outputted from the FFT unit 1110 and outputs the detected pilot symbols to the channel estimating unit 1114. By utilizing the pilot symbols outputted from the pilot symbol extracting unit 1112, the channel estimating unit 1114 performs the channel estimation and outputs the channel estimation result to the equalizer 1116. The terminal receiver generates the CQI (channel quality information) corresponding to the channel estimation result of the channel estimating unit 1114, transmitting the generated CQI through the CQI transmitter (not shown) to the transmitter.

After demodulating the signal outputted from the parallel/serial converter 1118 by a corresponding demodulation scheme, the symbol demapping unit 1120 outputs to the decoder 1122. The decoder 1122 outputs a final received data, after decoding the signal outputted from the symbol demapping unit 1120 by a corresponding decoding scheme. Here, the demodulation scheme and the decoding scheme corresponds to the modulation scheme and the coding scheme that are applied by the transmitter.

Figure 12:
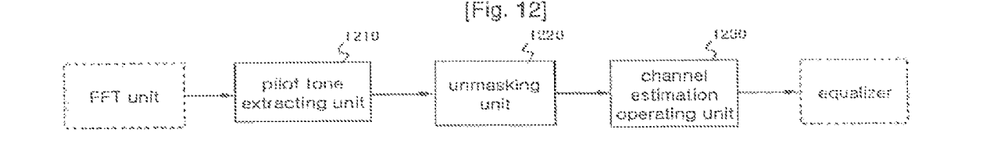
FIG. 12 is a block diagram that shows the configuration of a channel estimation apparatus in an orthogonal frequency division multiple access system according to the present invention.

FIG. 12 is a block diagram that shows the configuration of a channel estimation apparatus in an orthogonal frequency division multiple access system according to the present invention, corresponding to the pilot symbol extracting unit 1112 and channel estimating unit 1114 of FIG. 11. The channel estimation apparatus includes a pilot tone extracting unit 1210, an unmasking unit 1220 and a channel estimation operating unit 1230.

The pilot tone extracting unit 1210 extracts the pilot tone masked with the orthogonal code in the transmitting side, which corresponds to the channel for estimating with the received signal which is Fourier transformed. The unmasking unit 1220 performs the unmasking of the extracted pilot tone.

In case of the DL, it is desirable that the unmasking unit 1220 performs the unmasking of the orthogonal code which is masked for the adjacent eight pilot tones forming the rectangular window form among the pilot tones inserted into the DL subframe.

As shown in FIG. 6, the unmasking of the orthogonal code is performed for the frame into which the pilot tone is inserted by moving the rectangular window from left to right, from top to bottom. In case of UL, the unmasking unit 1220 forms the tile of the UL subframe, and performs the unmasking of the orthogonal code for four pilot tones which is masked with the orthogonal code. The channel estimation operating unit 1230 estimates a channel by performing the averaging of the unmasked pilot tones.

Figure 13:
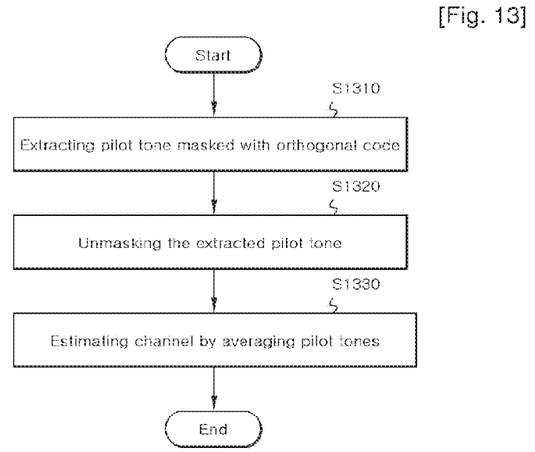
FIG. 13 is a flowchart that shows the channel estimation method in the orthogonal frequency division multiple access system according to the present invention.

FIG. 13 is a flowchart that shows the channel estimation method in the orthogonal frequency division multiple access system according to the present invention.

Firstly, the pilot tone, corresponding to the channel for estimating, masked with the orthogonal code is extracted from the received signal which is Fourier transformed (S1310). Then, the extracted pilot tone is unmasked (S1320). In case of down-link, the orthogonal code masked for eight pilot tones forming the rectangular window form is unmasked, and, as shown in FIG. 6, the rectangular window performs smoothing, by channel from left to right, from top to bottom. Further, in case of up-link, the orthogonal code is unmasked for the four pilot tones masked with the orthogonal code. Then, the averaging of the unmasked pilot tones is performed to estimate a channel (S1330).

In the meantime, for an example of the UL subframe, the channel estimation of the present invention will be described in detail. In the IEEE 802.16e (Wibro), the pilot tone is positioned in the corner of a square in the tile forming the UL subframe. The pilot tone that masked the orthogonal code of the present invention is generated as follows.

When the orthogonal code for the pilot tone forming the tile of the UL subframe for channel estimation in a receiving side is 1111, the pilot tone of the tile masked with the orthogonal code becomes A A A A (Here, A is the intensity of the pilot tone signal). In the meantime, in case the orthogonal code for the pilot tone forming the tile of the UL subframe for the cell or sector which are adjacent to the cell or sector to which the tile belongs is 1 −1 1 −1, the masked pilot tone of the tile masked with the orthogonal code becomes A −A A −A.

In the meantime, the process that the pilot tone generated in a transmitter is used for the channel estimation in a receiver. Firstly, pilot tones masked with the orthogonal code is extracted in the receiver. When the signal intensity faded in a radio channel is B and the phase change is θ, the pilot tone signal masked with the orthogonal code 1111 in the transmitter becomes $Be^{j\theta}$ $Be^{j\theta}$ $Be^{j\theta}$ $Be^{j\theta}$.

In the meantime, the pilot tone signal masked with the orthogonal code 1 −1 1 −1 in the transmitter of the adjacent cell or sector becomes $Ce^{j\Phi}$ $-Ce^{j\Phi}$ $Ce^{j\Phi}$ $-Ce^{j\Phi}$, when the signal intensity faded in a radio channel is C and the phase change is Φ. In this way, when the unmasking for the pilot tone is performed in the receiver, the unmasked pilot tone becomes $Be^{j\theta}$ $Be^{j\theta}$ $Be^{j\theta}$ $Be^{j\theta}$, and the pilot tone of the adjacent cell or sector becomes $Ce^{j\Phi}$ $-Ce^{j\Phi}$ $Ce^{j\Phi}$ $-Ce^{j\Phi}$ since the orthogonal code of the cell for channel estimation continues with 1111. By averaging them, the channel in data tone for channel estimation can be estimated. That is, it becomes the following Equation 1.

$$\text{The estimated pilot tone} = (Be^{j\theta} + Be^{j\theta} + Be^{j\theta} + Be^{j\theta})/4 \quad [\text{Equation 1}]$$
$$(Ce^{j\Phi} - Ce^{j\Phi} + Ce^{j\Phi} - Ce^{j\Phi})/4$$
$$= Be^{j\theta}$$

As shown in Equation 1, since the pilot tone is masked with the orthogonal code in the transmitter, in the channel estimating, the interference of the pilot tone in the adjacent cell or sector is eliminated due to the orthogonality. Similarly, in case of DL, the interference of the adjacent cell or sector is eliminated when it is masked with the orthogonal code under the same principles as UL.

In the present invention, all base stations can use the same PRBS, while other orthogonal code sequence can be applied for the pilot subcarrier used in the channel estimation for each cell or sector. The interference from other user is eliminated by using an orthogonality in channel estimating, by applying the PRBS for data tone, and by applying the orthogonal code used in the present invention for the pilot subcarrier. Moreover, different users can be distinguished by using the orthogonal code after applying the same PRBS to the pilot sub carrier by each permutation scheme.

Figure 14:
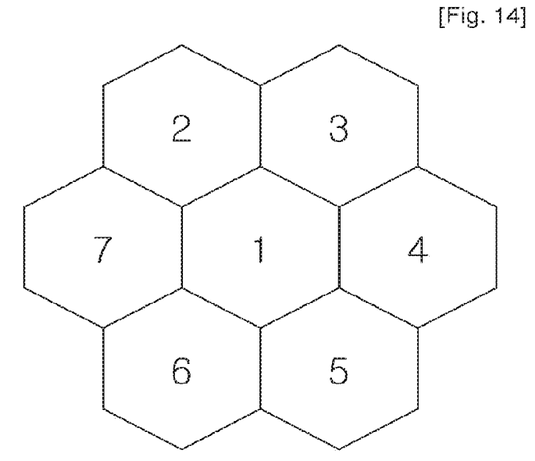
FIG. 14 shows an example of the orthogonal code allocation within a cell which is not sectored with the FRF (Frequency Reuse Factor)-1.

FIG. 14 shows an example of the orthogonal code allocation within a cell which is not sectored with the FRF (Frequency Reuse Factor)-1. A code is assigned to minimize the interference between cells by assigning a different orthogonal code to each cell.

Figure 15:
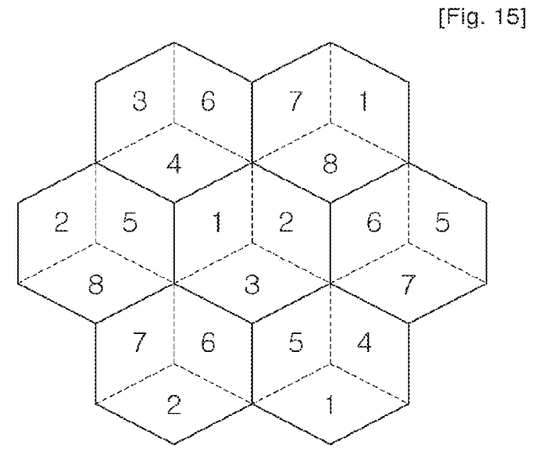
FIG. 15 shows the orthogonal code allocation within a cell which is sectored with the FRF-1. The code is assigned in order that the same code is allocated to be far away each other as far as possible so that the interference may be minimized.

FIG. 15 shows the orthogonal code allocation within a cell which is sectored with the FRF-1. The code is assigned in order that the same code is allocated to be far away each other as far as possible so that the interference may be minimized.

Figure 16:
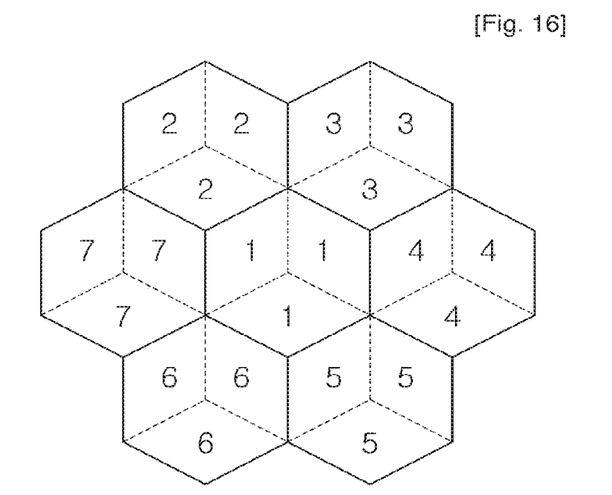
FIG. 16 shows the orthogonal code allocation in the cell which is sectored with the FRF-3.

FIG. 16 shows the orthogonal code allocation in the cell which is sectored with the FRF-3. In case of FRF-3, since the frequency band is physically divided into three, the interference does not affect even when the same orthogonal code is used in the same cell, therefore, a code is assigned like FIG. 14.

Figure 17:
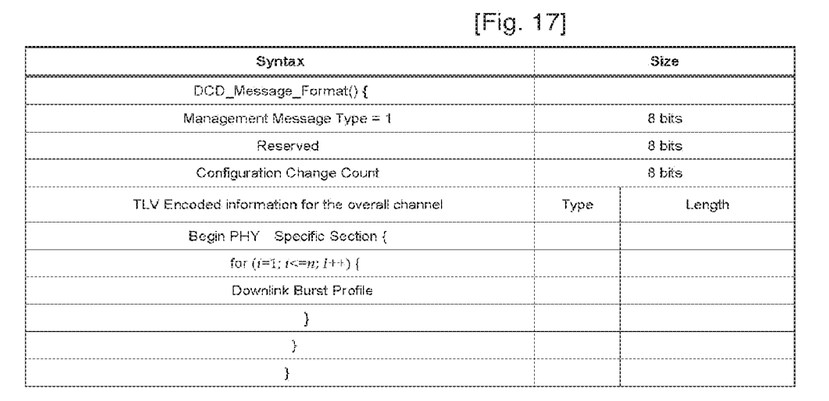
FIGS. 17 and 18 show that the orthogonal code word information field is added to the NBR-ADV message (Neighbor Advertisement Message) transmitted and received in the hand-over.
Figure 18:
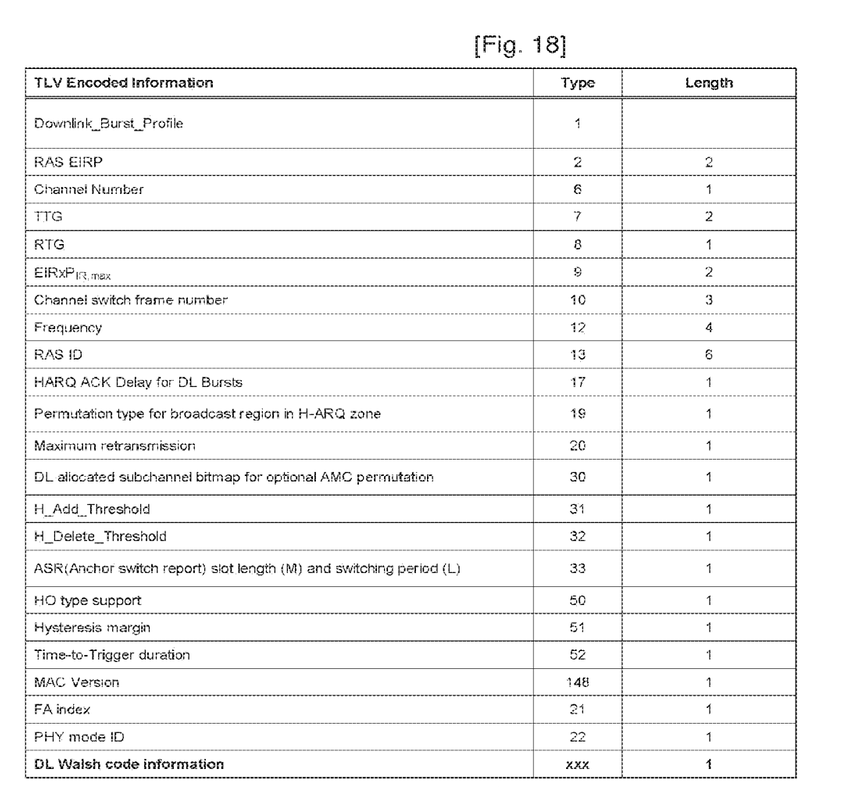

FIGS. 177 and 18 show that the orthogonal code word information field is added to the NBR-ADV message (Neighbor Advertisement Message) transmitted and received in the hand-over. The present invention provides orthogonal code word information of the cell or sector that is hand-overed by adding the orthogonal code word information, that is, the orthogonal code set one to set eight to the DCD (Downlink Channel Descriptor) TLV (Type, Length, Value) field.

Figure 19:
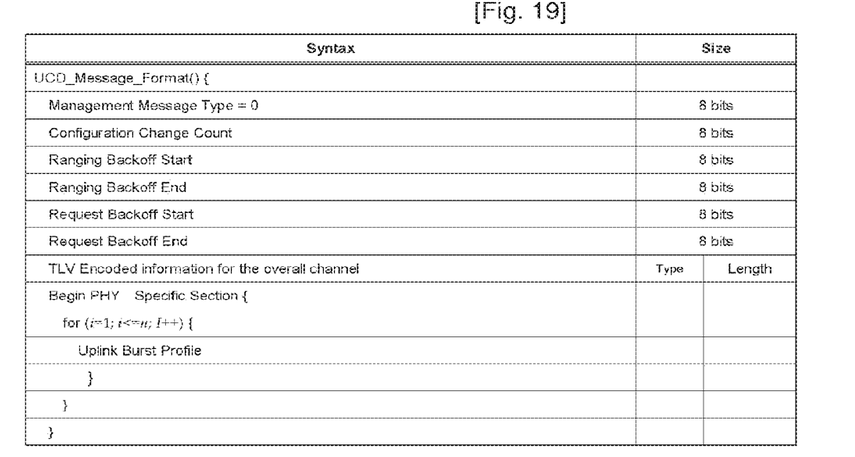
FIGS. 19 and 20 show that the orthogonal code word information is added to the UCD (Uplink Channel Descriptor) TLV field.
Figure 20:
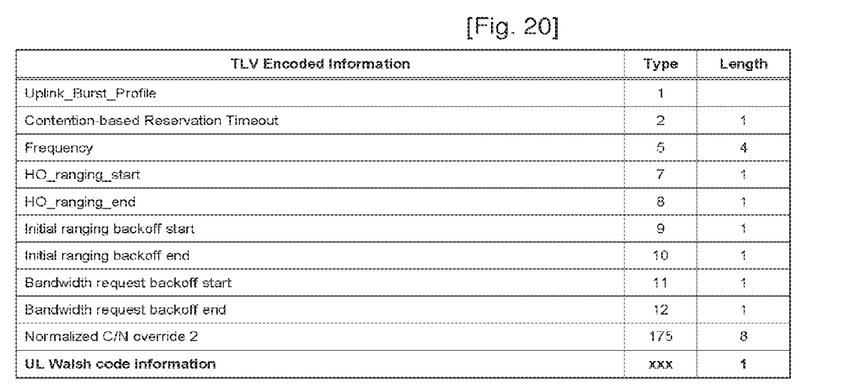

FIGS. 19 and 20 show that the orthoponal code word information is added to the UCD (Uplink Channel Descriptor) TLV field. The DCD TLV information that is delivered to the NBR-ADV message in a hand-over is used by adding an orthogonal codeword information bit to the DCD TLV. Additionally, in the network entry, the terminal performs the cross correlation for eight orthogonal codewords to find.

Meanwhile, functions used in an apparatus and a method disclosed in the present specification can be embodied in storage media that a computer can read as codes that the computer can read. The storage media that the computer can read, include all sorts of record devices in which data that can be read by a computer system is stored. Examples of the storage media that the computer can read, include ROMs, RAMs, CD-ROMs, magnetic tape, floppy discs, optic data storage devices, etc., and also, include things embodied in the form of carrier wave (e.g., transmission through the internet). Furthermore, the storage media that the computer can read is distributed in a computer system connected with networks. Then, the codes that the computer can read, are stored in the distributed storage media in a distribution scheme, and the codes can be executed in the distribution scheme.

While the invention has been shown and described with reference to certain exemplary embodiments thereof, it will be understood by those skilled in the art various changes in form and details may be made therein without departing from the spirit and scope of the invention. Therefore, the spirit and scope of the present invention must be defined not by described embodiments thereof but by the appended claims and equivalents of the appended claims.

The invention claimed is:

1. A method of transmitting signals in a wireless communication system, comprising:
multiplying a modulation symbol with a sequence;
selecting an orthogonal sequence from a set of orthogonal sequences represented by a matrix, wherein rows of the matrix constitute the orthogonal sequences;
generating a pilot with the orthogonal sequence;
transmitting the multiplied modulation symbol in an Orthogonal Frequency Division Multiplexing (OFDM) symbol of a resource block, and transmitting the pilot in another OFDM symbol of the resource block; and
transmitting information about the selected orthogonal sequence in a message, wherein the information is for use in receiving the pilot, wherein:
the resource block comprises a plurality of subcarriers in a frequency domain and a plurality of the OFDM symbols in a time domain, respectively,
the resource block is an uplink resource block, and
the pilot is transmitted on more subcarriers within the uplink resource block than another pilot transmitted within a downlink resource block.

2. The method of claim 1, wherein the orthogonal sequence distinguishes different users.

3. The method of claim 1, wherein the selecting step, the generating step, and the transmitting step are performed by a mobile terminal.

4. The method of claim 1, wherein the multiplied modulation symbol and the pilot are transmitted in an uplink (UL) subframe.

5. The method of claim 1, wherein the modulation symbol is generated using Binary Phase Shift Keying (BPSK) or Quadrature Phase Shift Keying (QPSK).

6. A transmitter in a wireless communication system, comprising:
a symbol mapping unit, implemented by a processor, configured to generate a modulation symbol;
a pilot symbol inserting unit, implemented by the processor, configured to multiply the modulation symbol with a sequence, select an orthogonal sequence from a set of orthogonal sequences represented by a matrix, and generate a pilot with the orthogonal sequence, wherein rows of the matrix constitute the orthogonal sequences; and
an RF processing circuit configured to:
transmit the multiplied modulation symbol in an Orthogonal Frequency Division Multiplexing (OFDM) symbol of a resource block, and transmit the pilot in another OFDM symbol of the resource block, and
transmit information about the selected orthogonal sequence in a message, wherein the information is for use in receiving the pilot, wherein:
the resource block comprises a plurality of subcarriers in a frequency domain and a plurality of the OFDM symbols in a time domain, respectively,
the resource block is an uplink resource block, and
the pilot is transmitted on more subcarriers within the uplink resource block than another pilot transmitted within a downlink resource block.

7. The transmitter of claim 6, wherein the orthogonal sequence distinguishes different users.

8. The transmitter of claim 6, wherein the transmitter is implemented in a mobile terminal.

9. The transmitter of claim 6, wherein the multiplied modulation symbol and the pilot are transmitted in an uplink (UL) subframe.

10. The transmitter of claim 6, wherein the modulation symbol is generated using Binary Phase Shift Keying (BPSK) or Quadrature Phase Shift Keying (QPSK).

11. A method of transmitting signals in a wireless communication system, comprising:
receiving, in a downlink message, first information to select an orthogonal sequence from a set of orthogonal sequences represented by a matrix, wherein rows of the matrix constitute the orthogonal sequences;
generating a signal by multiplying a modulation symbol with a sequence;
generating a pilot with the orthogonal sequence;
transmitting the signal in an Orthogonal Frequency Division Multiplexing (OFDM) symbol of a resource block, and transmitting the pilot in another OFDM symbol of the resource block; and
transmitting second information about the selected orthogonal sequence in another message, wherein the second information is for use in receiving the pilot, wherein:
the resource block comprises a plurality of subcarriers in a frequency domain and a plurality of the OFDM symbols in a time domain, respectively,
the resource block is an uplink resource block, and
the pilot is transmitted on more subcarriers within the uplink resource block than another pilot transmitted within a downlink resource block.

12. The method of claim 11, wherein the orthogonal sequence distinguishes different users.

13. The method of claim 11, wherein the selecting step and the transmitting step are performed by a mobile terminal.

14. The method of claim 11, wherein the signal and the pilot are transmitted in an uplink (UL) subframe.

15. The method of claim 11, wherein the modulation symbol is generated using Binary Phase Shift Keying (BPSK) or Quadrature Phase Shift Keying (QPSK).

16. A transmitter in a wireless communication system, comprising:
a symbol mapping unit, implemented by a processor, configured to generate a modulation symbol;
a pilot symbol inserting unit, implemented by the processor, configured to generate a signal by multiplying the modulation symbol with a sequence, and to generate a pilot with an orthogonal sequence from a set of orthogonal sequences represented by a matrix, wherein rows of the matrix constitute the orthogonal sequences, and wherein first information for selecting the orthogonal sequence is provided in a downlink message; and
an RF processing circuit configured to:
transmit the signal in an Orthogonal Frequency Division Multiplexing (OFDM) symbol of a resource block, and transmit the pilot in another OFDM symbol of the resource block, and
transmit second information about the selected orthogonal sequence in another message, wherein the second information is for use in receiving the pilot, wherein:
the resource block comprises a plurality of subcarriers in a frequency domain and a plurality of the OFDM symbols in a time domain, respectively,
the resource block is an uplink resource block, and the pilot is transmitted on more subcarriers within the uplink resource block than another pilot transmitted within a downlink resource block.

17. The transmitter of claim 16, wherein the orthogonal sequence distinguishes different users.

18. The transmitter of claim 16, wherein the transmitter is implemented in a mobile terminal.

19. The transmitter of claim 16, wherein the signal and the pilot are transmitted in an uplink (UL) subframe.

20. The transmitter of claim 16, wherein the modulation symbol is generated using Binary Phase Shift Keying (BPSK) or Quadrature Phase Shift Keying (QPSK).

* * * * *